(12) United States Patent
Nelson

(10) Patent No.: US 6,609,805 B1
(45) Date of Patent: Aug. 26, 2003

(54) ILLUMINATED KEYBOARD

(76) Inventor: Michael T. Nelson, 6805 Garden Hwy., Sacramento, CA (US) 95837

( * ) Notice: Subject to any disclaimer, the term of this patent is extended or adjusted under 35 U.S.C. 154(b) by 0 days.

(21) Appl. No.: 10/082,041

(22) Filed: Feb. 20, 2002

(51) Int. Cl.$^7$ ............................................. G01D 11/28
(52) U.S. Cl. ..................... 362/30; 362/26; 362/85; 200/5 A; 200/314; 200/317; 345/175; 341/22
(58) Field of Search ................ 362/26, 85, 30; 200/5 A, 314, 317; 345/175; 341/22

(56) References Cited

U.S. PATENT DOCUMENTS

| 4,177,501 A | * 12/1979 | Karlin ........................ 362/26 |
| 4,365,120 A | * 12/1982 | Pounds ....................... 200/5 A |
| 4,806,908 A | 2/1989 | Krupnik |
| 4,812,831 A | * 3/1989 | Laier .......................... 345/175 |
| 5,266,949 A | * 11/1993 | Rossi .......................... 341/22 |
| 6,007,209 A | * 12/1999 | Pelka .......................... 362/30 |
| 6,030,088 A | 2/2000 | Scheinberg |
| 6,092,903 A | 7/2000 | Higgins, Jr. |
| 6,179,432 B1 | 1/2001 | Zhang et al. |
| 6,199,996 B1 | 3/2001 | Katrinecz, Jr. |
| 6,217,183 B1 | 4/2001 | Shipman |
| D443,615 S | 6/2001 | Kirchner |
| 6,284,988 B1 | 9/2001 | Watanabe et al. |

FOREIGN PATENT DOCUMENTS

WO       WO 00/34968       6/2000

* cited by examiner

Primary Examiner—Sandra O'Shea
Assistant Examiner—James W Cranson, Jr.
(74) Attorney, Agent, or Firm—Theodore J. Bielen, Jr.

(57) ABSTRACT

A keyboard structure utilizing a plurality of keys which are supported and extend from a surface of a housing. A translucent plate overlies at least a portion of the housing. A partition adjacent the translucent plate forms an envelope which extends around at least the majority of the perimeter of the housing. The envelope is illuminated by a suitable source of light.

4 Claims, 2 Drawing Sheets

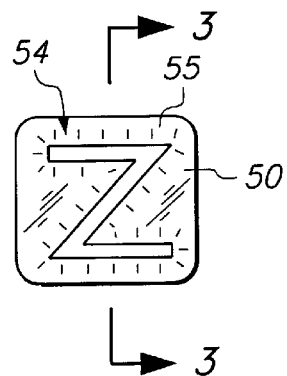
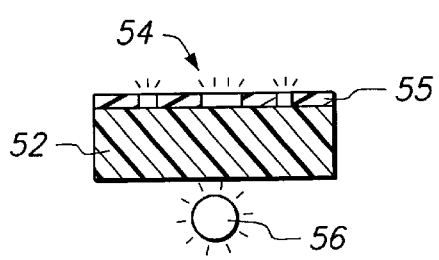
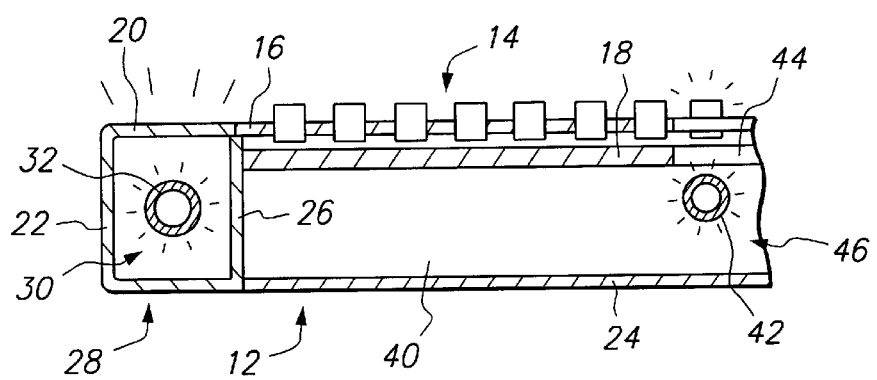
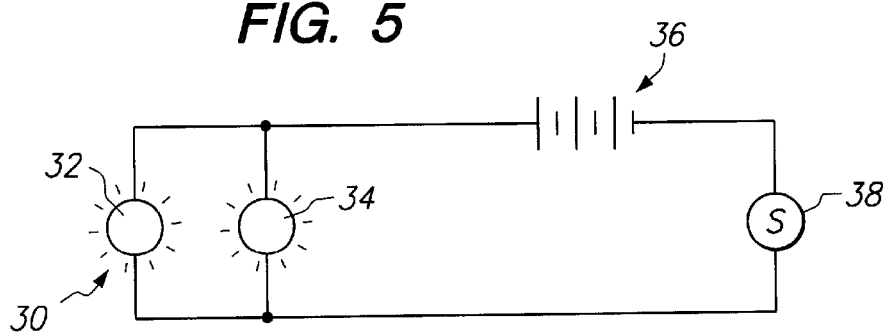

ILLUMINATED KEYBOARD

BACKGROUND OF THE INVENTION

The present invention relates to a novel and useful keyboard structure.

Keyboards are employed in many modern instruments and equipment such as computers, word processors, communication consoles, and the like. Most keyboards are used in lighted spaces, however, keyboards are also used in darkened spaces which require lamps or other light producing devices to allow the user to locate keys and switches on the keyboard.

In the past, many lighted keyboards have been proposed. For example, U.S. Pat. No. 6,284,988B1 shows a keyboard apparatus having illuminated keys through the use of an electroluminescent sheet.

U.S. Pat. Nos. 4,806,908, 6,092,903, 6,199,996B1, D.443,615S, and WO 00/34968 show keyboards in which individual keys are lit by various means.

U.S. Pat. Nos. 6,179,432B1 and 6,217,183B1 show lighting systems for a keyboard that employs a flat panel sandwiched below the keyboard to light the key members.

U.S. Pat. No. 6,030,088 describes a clear casing for an electronic component in order to advertise or provide a message on the electronic component.

A keyboard structure which provides unique illumination to the same would be a notable advance in the field of electronic equipment.

BRIEF SUMMARY OF THE INVENTION

In accordance with the present invention a novel and useful keyboard structure is herein provided which generates illumination for operation of such structure in darkened facilities.

The keyboard structure of the present invention utilizes a housing which serves to support a multiplicity of keys in a conventional manner. The housing is also provided with a surface which permits the projection of the multiplicity of keys outwardly therefrom. A chamber is formed below the surface and within the housing. A translucent plate overlies the housing chamber and is positioned laterally and adjacent to the multiplicity of keys. Combined with a partition, the translucent plate forms an envelope which extends about and forms the essential perimeter of the housing and of the multiplicity of keys projecting from the housing surface.

In certain cases, the chamber of the housing may constitute a first chamber and lie adjacent a second chamber immediately below the keys projecting from the surface of the housing. Illumination may also be provided in the second chamber and extend through the surface of the housing when such surface is formed of translucent material. Thus, the areas of the surface immediately adjacent the multiplicity of keys projecting from the first surface and within the perimeter of the illuminated envelope are also illuminated for use.

Means may be provided to control the levels of illumination in the envelope forming the perimeter of the housing, as well as the illumination emanating from the second chamber in the housing through the translucent first surface permitting projection of the keys. Both illumination sources may vary in color and intensity. Alternatively, the translucent surface of the housing, as well as the translucent plate may be formed of color filter material to provide illumination of a desired color.

It may be apparent that a novel and useful keyboard structure has been hereinabove described.

It is therefore an object of the present invention to provide a keyboard structure which illuminates the perimeter of a multiplicity of keys and serves as an attractive accent to a keyboard in darkened spaces.

Another object of the present invention is to provide a keyboard structure in which an illuminated envelope is formed about the perimeter of the multiplicity of keys of the keyboard and where such illumination levels of the envelope may be adjusted.

Another object of the present invention is to provide a keyboard structure in which the perimeter of the multiplicity of keys and areas between the keys are illuminated together, or separately in darkened environments.

A further object of the present invention is to provide a keyboard structure utilizing a multiplicity of keys in which illumination is provided to permit the keyboard to be used in darkened spaces.

The invention possesses other objects and advantages especially as concerns particular characteristics and features thereof which will become apparent as the specification continues.

BRIEF DESCRIPTION OF THE SEVERAL VIEWS OF THE DRAWING

FIG. 2 is a top plan view of an individual key of the keyboard structure of the present invention.

FIG. 3 is a sectional view taken along line 3—3 of FIG. 2.

FIG. 4 is a sectional view taken along line 4—4 of FIG. 1.

FIG. 5 is an electrical schematic representing the illumination control used in the keyboard structure of the present invention.

Figure 1:
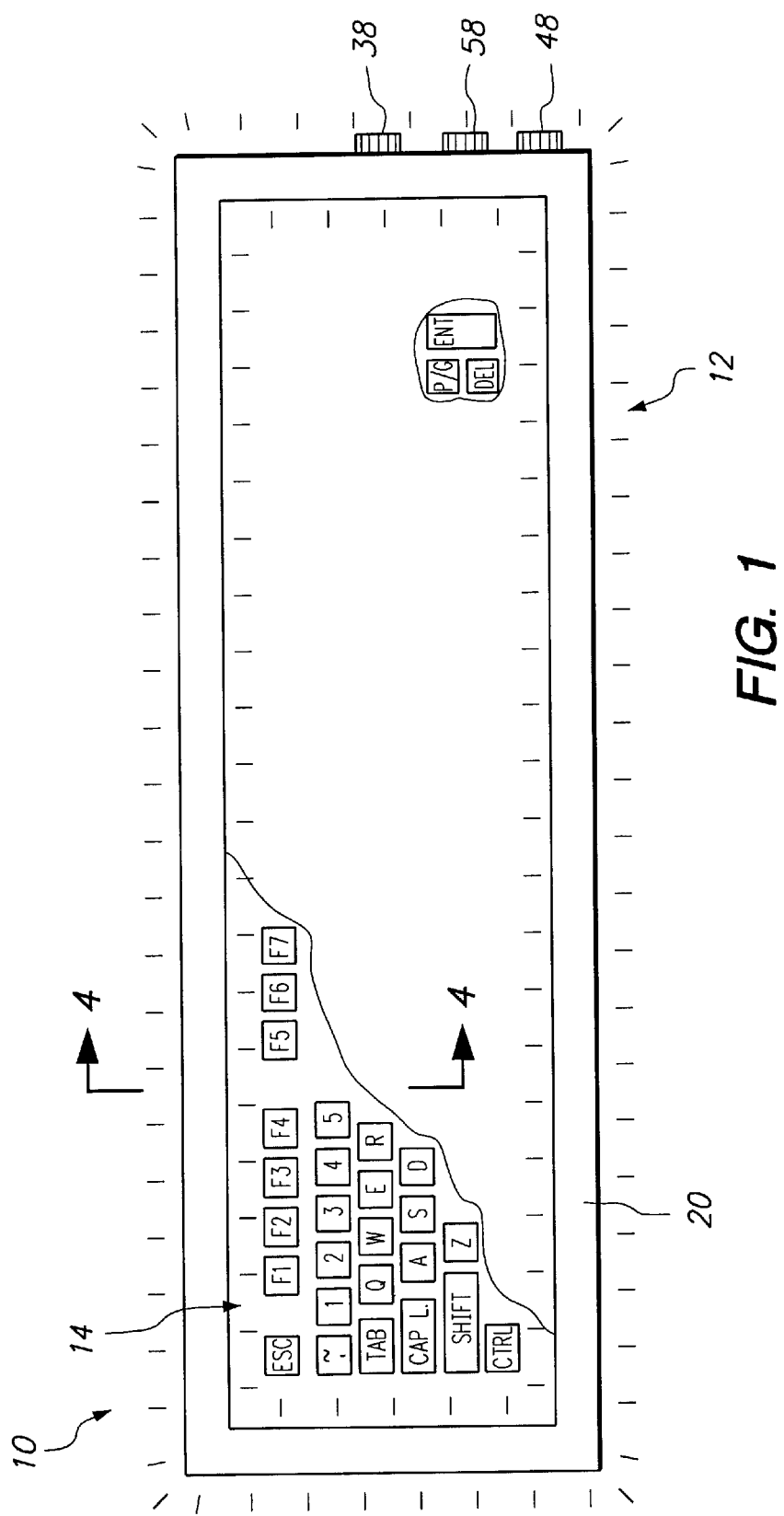
FIG. 1 is a top plan view of the keyboard structure of the present invention, showing a portion of the multiplicity of keys.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be taken together with the hereinabove delineated drawings.

The invention as a whole is shown in the drawings by reference character 10. Housing 12 supports a multiplicity of keys 14 of conventional configuration. Keys 14 may be similar to those shown in U.S. Pat. No. 6,217,183B1 as representing the prior art, which is incorporated by reference in whole hereto.

Turning to FIG. 4, it may be observed that housing 12 includes a surface 16 which permits the projection of multiplicity of keys 14 therefrom. Circuit board 18 is located below movable multiplicity of keys 14 to send various signals to an electronic component such as a computer. In this regard, the circuit board 18 structure is of conventional configuration and will not be described in greater detail for the sake of clarity. In any case, surface 16 is located between each of the individual keys 14. Surface 16 may be formed of translucent material, the purpose of which will be discussed hereinafter.

Referring again to FIGS. 1 and 4, translucent plate 20 is positioned over housing 12, specifically over wall 22 extending from bottom 24 of housing 12. Translucent plate may be formed separately from or integrally with surface 16. Translucent plate 20 extends about the perimeter of multiplicity of keys 14. A partition 26 located below surface 16 also extends about the perimeter of multiplicity of keys 14 to form an envelope 28. Envelope 28, thus, includes an upper portion formed of translucent plate 20 and partition 26 which extend completely around plurality of keys 14. Means 30 illuminates envelope 20 to allow light to pass through translucent plate around plurality of keys 14. Means 30 may include lamp 32. Lamp 32 may be continuous within envelope 28 or include a multiplicity of lamps such as lamp 34, FIG. 5. Lamp 32 is powered by electrical source 36 and controlled by dimmer switch 38. Thus, dimmer switch 38 comprises means for regulating the level of illumination within envelope 28.

With reference to FIG. 4, second chamber 40 is also formed by partition 26 and surface 16. Second chamber extends directly beneath plurality of keys 14 of keyboard structure 10. Lamp 42 is found within chamber 40 and serves to illuminate the same. When surface 16 is transparent, areas in surface 16 not occupied by plurality of keys 14 are illuminated. Gaps in circuit board 18, such as gap 44, permits such illumination to pass outwardly. In certain keyboards, such spaces on surface 16 are extensive due to the contours of the keyboard. However, the existence of such spaces are peculiar to a keyboard design and vary greatly. In any case, FIG. 5 also represents means 46 for controlling the illumination of lamp 42 through a dimmer switch such as dimmer switch 48 depicted in FIG. 1.

Referring now to FIGS. 2 and 3, it may be observed that individual keys such as key 50 may also be illuminated by forming key 50 of a translucent base 52 and employing the spaces 54 in element 55 serving as the identifying indicia for the key to permit the passage of light from lamp 56. Such system of lighting keys is shown in the prior art reference 6,217,183B1, which is incorporated in whole to this application. In any case, dimmer switch 58 may be employed to regulate the level of lamps such as lamp 56, for individual keys, such as key 50, of plurality of keys 14.

In operation, the user places keyboard structure 10 on a suitable surface and provides electrical source 36 thereto. At the desire of the user, envelope 28 may be illuminated to a certain degree with or without the illumination of surface 16 between plurality of keys 14 or the illumination of individual keys, such as key 50, due to typical lamp 56. Dimmer switches 38, 48, and 58 are employed in this regard to control the level of illumination of envelope 28, surface 16 and plurality of keys 14, respectively. Thus, keyboard structure 10 may be used in darkened spaces in conjunction with an electronic device, such as a computer, or simply serve as an attractive object in a darkened room.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A keyboard structure utilizing a multiplicity of keys, comprising:

a. a housing for supporting said multiplicity of keys, said housing including a surface permitting projection of the multiplicity of keys therefrom, and a chamber below said surface and within said housing;

b. a translucent plate overlying said housing chamber and positioned laterally adjacent said multiplicity of keys, and a partition forming an envelope comprising at least a majority of the perimeter of said housing surface; and c. means for illuminating said envelope.

2. The keyboard of claim 1 which additionally comprises means for regulating the level of illumination of said envelope.

3. The keyboard of claim 1 in which said chamber comprises a first chamber and which additionally comprises a second chamber within said housing, said second chamber being spaced from said housing surface and said first chamber, said translucent plate forming said surface of said housing, and means for illuminating said second chamber.

4. The keyboard of claim 3 which additionally comprises means for regulating the level of illumination of said envelope.

* * * * *